Nov. 1, 1955  E. P. NEHER  2,722,138

TORSIONAL VIBRATION ABSORBERS

Filed Nov. 30, 1950

INVENTOR.
Eldon Paul Neher
BY Evans & McCoy
attorneys

United States Patent Office 2,722,138
Patented Nov. 1, 1955

2,722,138

TORSIONAL VIBRATION ABSORBERS

Eldon Paul Neher, North Manchester, Ind., assignor to The General Tire and Rubber Company, Akron, Ohio, a corporation of Ohio Application November 30, 1950, Serial No. 198,419

11 Claims. (Cl. 74—574)

This invention relates to torsional vibration absorbers for application to engine crankshafts and the like to eliminate torsional vibrations of resonant frequency to which such shafts are susceptible at certain critical speeds.

The device of the present invention is in the form of a wheel adapted to be attached to a crankshaft and carrying a coaxial inertia member that is yieldingly supported on the wheel for angular oscillation about the said axis by means of an elastic rubber ring. The rubber ring is frictionally bonded to the wheel and to the inertia member by confining the rubber ring under radial pressure between the wheel and inertia member to create a frictional resistance to slippage that is sufficient to effectively bind the inertia member and wheel to said ring, making is unnecessary to form the rim and inertia member of or face the same with a metal to which rubber may be strongly adhered.

The rubber supporting and energy absorbing ring surrounds the inertia member within the rim of the wheel so that a relatively large area of contact is provided between the rubber ring and rim and between the rubber ring and inertia member, and an effective frictional bond can be provided with relatively light radial pressure. The mounting of the inertia member inside the wheel rim and cushioning ring also reduces circumferentially acting forces tending to cause slippage between the ring and inertia member.

In order to obtain a greater natural frequency of vibration without decreasing the energy absorbing characteristics of the rubber ring, the rubber ring is normally of an external diameter much less than that of the inertia member and is stretched around the periphery of the inertia member so that it is under a considerable circumferential tension.

Tuning a vibration absorber having an inertia member of any desired mass moment of inertia to the critical resonant torsional frequency is made possible by providing the wheel with a rim of bendable sheet metal which can readily be reduced in diameter by radial pressure applied by a spinning tool or drawing die to increase the radial compression of the rubber supporting ring and thereby increase the resonant frequency of the absorber without appreciably altering the mass moment of inertia or flywheel effect of the absorber. By alternately testing the absorber to determine its torsional resonant frequency and reducing the rim diameter by radially applied pressure, the absorber may be accurately tuned to the desired resonant torsional frequency.

The main objects of the invention are to provide an efficient torsional vibration absorber which is of simple and inexpensive construction, which has an inertia member supported for angular oscillations of small magnitude within the rim of a supporting wheel, which has a high natural torsional frequency combined with good energy absorbing characteristics, and which can be tuned to the desired resonant frequency without appreciably altering its mass moment of inertia.

Reference should be had to the accompanying drawings forming a part of this specification in which.

Figure 1:
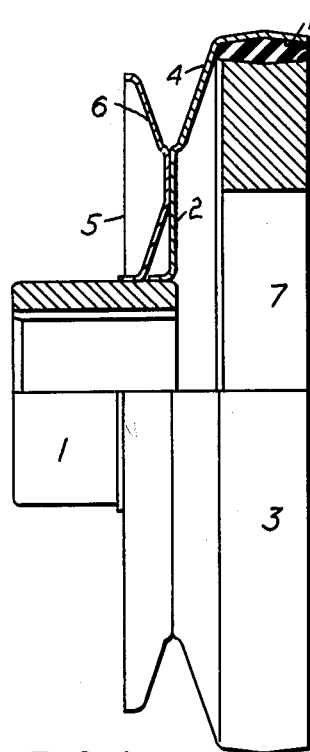
Figure 1 shows the upper half of a torsional vibration absorber embodying the invention in vertical section and the lower half in side elevation.
Figure 2:
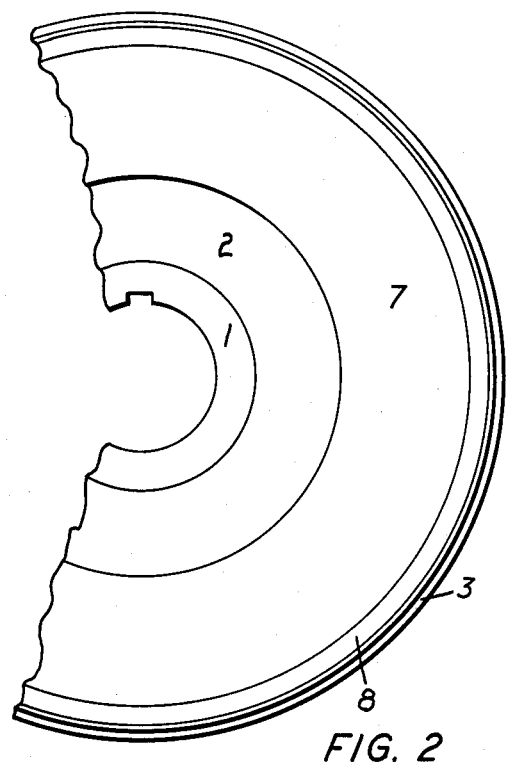
Fig. 2 is a fragmentary front elevation of the vibration absorber.
Figure 4:
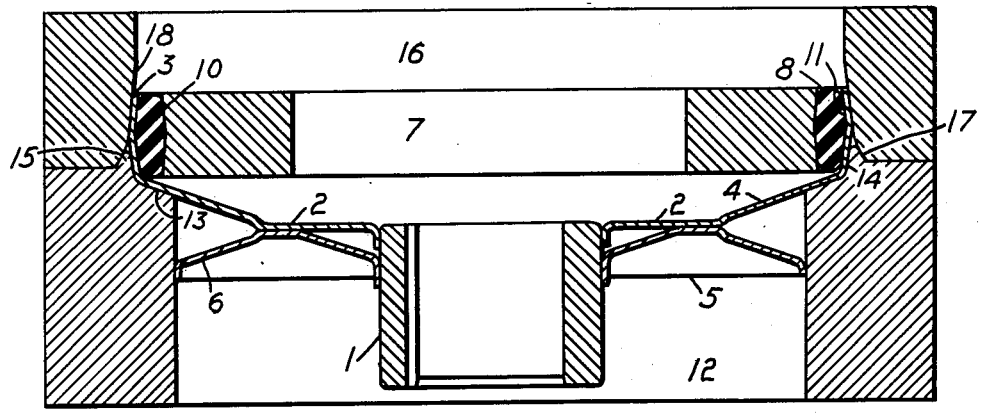
Fig. 4 is a sectional view showing drawing dies for clamping the rim of a wheel upon the rubber ring.

In the embodiment of the invention herein shown, the vibration absorbing device is in the form of a wheel adapted to be keyed to the shaft whose vibrations are to be absorbed. The wheel has a hub 1 to which is attached a wheel body in the form of a disk 2 that is provided with a laterally projecting peripheral flange or rim 3. The wheel may serve as a belt pulley as well as a vibration absorber and, as herein shown, the disk 2 has an inclined outer portion 4 and a second disk 5 is attached to the disk 2 inwardly of the inclined portion 4, the disk 5 having an inclined peripheral portion 6 which, with the inclined portion 4 of the disk 2, provides a circumferential belt receiving groove. Within the rim 3 of the wheel there is mounted an inertia member 7 which is relatively heavy and which may be in the form of a ring or annulus.

Figure 3:
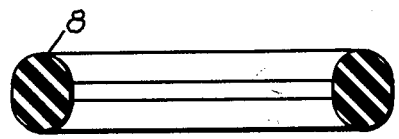
Fig. 3 is a transverse section through the rubber ring showing the normal size and shape of the ring, Fig. 3 being on the same scale as Figs. 1 and 2.

The inertia member 7 is supported concentrically within the rim 3 and spaced laterally from the wheel body 2 by means of a ring 8 which is formed of elastic rubber. When it is desired that the vibration absorbing device have a relatively high resonant torsional frequency, it is advantageous to have the ring 8 under circumferential tension. As herein illustrated, the ring is normally substantially of toroidal form as shown in Fig. 3 and of a diameter considerably less than that of the inertia member 7.

Prior to assembly of the member 7 within the rim 3, the ring 8 is stretched sufficiently to permit it to be placed upon the periphery of the member 7, after which the member 7 with the ring 8 thereon is assembled within the rim 3. As herein shown, the peripheral seating face 10 of the inertia member 7 is slightly concave in transverse section and the interior seating face 11 of the rim 3 is also slightly concave so that relative axial movements of the inertia member with respect to the rim 3 are effectively resisted by the ring 8.

In assembling the inertia member 7 and the energy absorbing ring 8 within the rim 3, the rim 3 is formed with a sufficient flare to permit the member 7 with the ring 8 thereon to be inserted by lateral pressure within the rim. The assembly is then placed in an annular bottom die 12 which is of an interior diameter to receive the disk 5 with a sliding fit and which has an inwardly tapering shoulder 13 upon which the outer portion 4 of the wheel body 2 rests. The die 12 has a shoulder 14 which exteriorly engages the inner portion of the rim 3, the upper portion of the shoulder 14 being the inner face of a rib 15 formed on the top edge of the die 12. The outer portion of the rim 3 is bent inwardly against the ring 8 by an annular die 16 which has a bell mouth 17 at its lower edge which is formed to fit over the rib 15 and which engages with the free edge of the rim 3 to deflect the same inwardly toward the ring 8, and above the bell mouth 17 the die 16 has an upwardly tapering face 18 which applies a gradually increasing pressure to the outer portion of the rim 3 to bend it inwardly against the outer edge portion of the ring 8.

The radial pressure exerted on the rubber ring 8 by the rim 3 creates a frictional bond between the rubber ring and the seating faces 10 and 11 of the inertia member and rim, making it unnecessary to adhere the rubber to the metal of the rim and inertia member. The provision of a frictional bond instead of an adhesive bond effects a saving in the cost of manufacture because the rubber engaging faces of the rim and inertia member do not need to be made of a metal to which rubber may be bonded.

By reason of the relatively large diameter of the ring 8, a relatively large area of contact is provided between the rubber ring 8 and each of the seating faces 10 and 11 and a relatively light radial pressure on the ring 8 will create sufficient frictional resistance to slip to securely bind the rim and inertia member to the ring 8. Furthermore, forces tending to cause circumferential slip between the ring 8 and the faces 10 and 11 are less because the faces 10 and 11 are disposed outwardly of the center of gyration.

By placing the rubber supporting ring 8 under circumferential tension the supporting ring is stiffened and the amplitude of movements of the inertia member 7 with respect to the rim 3 are reduced so that a higher resonant torsional frequency is obtained without impairing the energy absorbing characteristics of the cushioning ring.

By employing a supporting wheel of relatively large diameter and having a bendable sheet metal rim, a vibration absorbing device is obtained which can be readily tuned to the desired resonant torsional vibration frequency. After the initial rim contracting operation performed by the press dies, the resonant torsional frequency of the absorber may be considerably less than that required for the shaft to which the device is to be attached. The vibration absorbing device can then be placed upon the shaft of a testing machine which may be operated at the speeds necessary to determine the resonant torsional frequency of the device, after which the rotation of the shaft may be slowed down and the outer edge portion of the rim 3 may be contracted by pressing a roller against it. By alternately measuring the resonant torsional frequency and increasing the same by increasing the radial pressure exerted upon the rubber ring 8 by the rim 3, the vibration absorber may be tuned to the critical resonant torsional frequency for the shaft to which the device is to be applied.

It is to be understood that variations and modifications of the specific devices herein shown and described for purposes of illustration, may be made without departing from the spirit of the invention.

What I claim is:

1. A torsional vibration absorber for engine crankshafts and the like comprising a wheel body, an annular laterally projecting sheet metal rim carried by the body and provided with an internal circumferential seating face, an inertia member having an external circumferential seating face of less diameter than the seating face of the rim portion, and a ring of elastic rubber encircling said inertia member and interposed between said seating faces, said ring having its radial thickness reduced and its axial width increased by radial compression between said faces to provide a frictional bond between said seating faces and said ring, said ring attaching said inertia member to said rim and yieldably supporting the same within said rim, said rim being bendable to increase the radial pressure on said elastic rubber ring whereby the absorber may be tuned to the critical resonant torsional frequency of the shaft to which the absorber is applied.

2. A torsional vibration absorber for engine crankshafts and the like comprising a wheel body, an annular rim carried by the body and projecting laterally therefrom, said rim being provided with an internal circumferential seating face, an inertia member having an external circumferential seating face of less diameter than the seating face of the rim portion, said inertia member being disposed within said rim alongside said wheel body and out of contact with said wheel body, and a ring of elastic rubber encircling said inertia member and interposed between said seating faces, said ring having its radial thickness reduced and its axial width increased by radial compression between said seating faces and providing the sole support for said inertia member.

3. A torsional vibration absorber for engine crankshafts and the like comprising a wheel body, an annular rim carried by the body and provided with an internal circumferential seating face, an inertia member having an external circumferential seating face of less diameter than the seating face of the rim portion, and a ring of elastic rubber supporting said inertia member within said rim, said ring being normally of an external diameter materially less than that of said inertia member, said ring being stretched under considerable circumferential tension around said inertia member and held under substantial radial compression between said seating faces to attach said inertia member to said rim and to yieldingly support said inertia member within said rim.

4. A torsional vibration absorber for engine crankshafts and the like comprising a wheel body, an annular rim carried by the body and provided with an internal circumferential seating face, an inertia member within said rim and having an external circumferential seating face of less diameter than the seating face of the rim portion, and a ring of elastic rubber interposed between said seating faces for attaching said inertia member to the rim and yieldingly supporting said inertia member, said ring being normally of substantially toroidal form and of an external diameter materially less than that of said inertia member, said ring being flattened by considerable circumferential tension around said inertia member and by radial compression between said seating faces.

5. A torsional vibration absorber for engine crankshafts and the like comprising a wheel body, a rim carried by said body and offset laterally with respect thereto, an inertia member of an external diameter less than the internal diameter of said rim, said inertia member being positioned within said rim and spaced laterally from said wheel body, and an elastic rubber ring encircling said inertia member and interposed between the external periphery of said inertia member and the internal periphery of said rim, said ring having its radial thickness decreased materially by circumferential tension and by radial compression between said rim and said inertia member to attach said inertia member to said rim and to yieldably support said inertia member on said rim.

6. A torsional vibration absorber for engine crankshafts and the like comrising a relatively light wheel formed of sheet metal, said wheel having a disk body and an integral laterally projecting rim, a relatively heavy inertia member of an external diameter less than the internal diameter of said rim, said inertia member being mounted within said rim and concentric therewith, and a ring of elastic rubber encircling said inertia member and retained under radial compression between said inertia member and rim and forming the sole support for said inertia member, said rim being bendable to increase the radial pressure on said elastic rubber ring whereby the absorber may be tuned to the critical resonant torsional frequency of the shaft to which the absorber is applied.

7. A torsional vibration absorber for engine crankshafts and the like comprising a relatively light wheel formed of sheet metal, said wheel having a disk body and an integral laterally projecting deformable rim, a relatively heavy inertia member of an external diameter less than the internal diameter of said rim, said inertia member being mounted within said rim and concentric therewith, and an elastic rubber ring which is normally of substantially toroidal form and of an external diameter materially less than that of said inertia member, said ring being stretched around the periphery of said inertia member, said ring being held under radial compression between said rim and said inertia member and forming the sole support for said member.

8. A torsional vibration absorber for engine crankshafts and the like comprising a wheel having a laterally projecting rim formed of bendable sheet metal, a rigid annular inertia member mounted within said rim and concentric therewith, and a ring of elastic rubber encircling said inertia member and clamped under radial compression between said rim and the external periphery of said inertia member, the resonant frequency of said absorber being variable by bending said rim and increasing said radial compression, said elastic rubber ring forming the sole support for said inertia member.

9. A torsional vibration absorber for engine crankshafts or the like comprising a wheel body, an annular rim member carried by the body, an inertia member, one of said members having an internal circumferential seating face and the other of said members having an external circumferential seating face of less diameter than said internal face, and a ring of elastic rubber interposed between said faces and forming the sole support for said inertia member, said ring being normally of a diameter materially less than said other of said members, said ring being materially reduced in radial thickness due to tension stresses and being stretched around said other of said members.

10. A method of making torsional vibration absorbers for engine crankshafts or the like comprising stretching an elastic rubber ring around a rigid internal annulus to provide frictional engagement between the ring and the annulus and to considerably reduce the radial thickness of the ring, and thereafter compressing said rubber ring between said annulus and an annular metal member to provide frictional engagement between the rubber ring and the annular member and to increase the critical resonant torsional frequency of the absorber to that of the shaft to which the absorber is applied.

11. A method of making torsional vibration absorbers for engine crankshafts and the like comprising stretching an elastic rubber ring around the periphery of an annular inertia member having an external diameter materially greater than the external diameter of said ring so as to considerably reduce the radial thickness of said ring, clamping said ring between said inertia member and an annular rim of a relatively light wheel, comparing the resonant torsional frequency of the absorber with the desired resonant torsional frequency, and applying a radial pressure to said rubber ring so as to increase said frequency to said desired frequency without appreciably altering the mass moment of inertia of the absorber.

References Cited in the file of this patent

UNITED STATES PATENTS

| | | |
|---|---|---|
| 1,949,520 | Whisler | Mar. 6, 1934 |
| 2,153,914 | Christman | Apr. 11, 1939 |
| 2,526,744 | Hardy | Oct. 25, 1950 |
| 2,556,999 | Hardy | June 12, 1951 |
| 2,594,555 | Hardy | Apr. 29, 1952 |